United States Patent [19]

Van Lier

[11] Patent Number: 5,465,306
[45] Date of Patent: Nov. 7, 1995

[54] IMAGE STORAGE DEVICE WHICH STORES PORTIONS OF IMAGE DATA DEFINING PIXELS MAKING UP AN IMAGE, AN IMAGE PROCESSING DEVICE INCLUDING THE IMAGE STORAGE DEVICE

[75] Inventor: Antonius J. M. Van Lier, Eindhoven, Netherlands

[73] Assignee: U.S. Philips Corporation, New York, N.Y.

[21] Appl. No.: 279,984

[22] Filed: Jul. 25, 1994

Related U.S. Application Data

[63] Continuation of Ser. No. 46,475, Apr. 12, 1993, abandoned, which is a continuation of Ser. No. 794,282, Nov. 19, 1991, abandoned.

[30] Foreign Application Priority Data

Nov. 28, 1990 [NL] Netherlands ............................ 9002593

[51] Int. Cl.[6] ...................................... G06K 9/36
[52] U.S. Cl. ............................. 382/276; 395/282
[58] Field of Search ....................... 382/1, 41, 49; 358/403, 404, 444, 448, 453; 395/115, 164; 364/134

[56] References Cited

U.S. PATENT DOCUMENTS

| 4,545,068 | 10/1985 | Tabata et al. | 382/41 |
| 4,606,066 | 8/1986 | Hata et al. | 382/49 |
| 4,736,438 | 4/1988 | Persoon et al. | 382/34 |
| 4,953,229 | 8/1990 | Abe et al. | 382/41 |
| 4,991,109 | 2/1991 | Crookshanks | 382/41 |

FOREIGN PATENT DOCUMENTS

| 0166270 | 1/1986 | European Pat. Off. . |
| 0206713 | 12/1986 | European Pat. Off. . |
| 3714011 | 2/1988 | Germany . |

OTHER PUBLICATIONS

Neumann et al., Translation of German Laid open application 3714011, Nov. 2, 1988.

Primary Examiner—Yon J. Couso
Attorney, Agent, or Firm—Richard A. Weiss

[57] ABSTRACT

An image storage device which stores portions of image data defining pixels making up an image (e.g., a very large image) for further processing, and an image processing device including the image storage device. The image storage device includes an addressing unit for sequentially receiving the image data defining the pixels making up the image, and addressing the pixels as a grid of multi-pixel cells; a working memory for storing only the image data defining those pixels included in certain of the cells; storage units for storing information concerning those cells; and a storage control unit for specifying, as the image data defining the pixels making up the image is being received by the image storage device, those pixels whose image data is to be stored in working memory. The working memory stores the image data for those pixels included in cells having particular image characteristics, and, possibly, the image data for those pixels included in the cells neighboring those cells. The image storage device stores less than all of the image data pertaining to all of the pixels of the image.

10 Claims, 2 Drawing Sheets

1

IMAGE STORAGE DEVICE WHICH STORES PORTIONS OF IMAGE DATA DEFINING PIXELS MAKING UP AN IMAGE, AN IMAGE PROCESSING DEVICE INCLUDING THE IMAGE STORAGE DEVICE

CROSS-REFERENCE TO RELATED APPLICATIONS

This is a continuation of application Ser. No. 08/046,475, filed Apr. 12, 1993, now abandoned, which is a continuation of application Ser. No. 07/794,282, filed Nov. 19, 1991, and now abandoned.

BACKGROUND OF THE INVENTION

The invention relates to an image storage device and an image processing device including the image storage device. In an image storage device, an image is picked up by an image pick-up device, such as, for example, a CCD camera, and is written, under the control of control signals from the image pick-up device, into a working memory, for example, a frame buffer, for further processing, for example, error detection and analysis by a computer.

In the case of a very large image, the working memory must be impractically large. The need for a large working memory can be obviated if the further processing of a very large image is done in real-time. However, further processing of a very large image in real-time is so time consuming that real-time processing is not feasible, especially since use of a number of parallel computers in order to increase the further processing speed is complex and very expensive.

SUMMARY OF THE INVENTION

It is, therefore, inter alia, an object of the invention to provide an image storage device which enables further processing of a very large image without requiring a large working memory or complex and expensive computers. As such, it is a further object of the invention to provide an image storage device in which relevant areas of a line-wise presented very large image are selectively stored for possible real-time further processing.

The invention provides an image storage device which comprises a working memory and which is suitable to receive trigger data from a processor which detects image characteristics in an image which is represented by an image signal. The image signal, which has serial, line-wise image data defining to pixels making up the image, is line-wise presented to the processor by an image pick-up device. The image storage device is also suitable to receive the image data from a multi-image line delay device which delays the image signal from the image pick-up device for further processing of it and the trigger data by a computer. The image storage device also comprises a unit for addressing the pixels making up the image as a grid of uniform multi-pixel cells, a storage control unit for storing in the working memory at least the cells in which image characteristics have been detected, a first storage unit for storing information concerning the location of those cells in the grid, and a second storage unit for storing information concerning the position and the nature of the detected image characteristics in each cell. The invention is such that only relevant image areas or cells in which the image characteristics (for example, errors or given shapes) have been detected by the processor are stored in the working memory, with information pertaining to the contents and the location of those cells in the image also being stored so that the relationship of the cells stored is known.

The image signal is scanned only once, and reduction of image data is achieved in hardware so that real-time further processing in software is possible. Relevant cells are never stored more than once. A fast hardware module for an image processing device is, thus, achieved.

An embodiment of an image storage device in accordance with the invention is characterized in that the storage control unit is also suitable for storing in the working memory neighbor cells of cells in which image characteristics have been detected, and the first storage unit is suitable for storing information concerning the location of those neighbor cells. Thus, an environment of the relevant cells which is free from image characteristics is also stored. This is advantageous, for the further processing.

Another embodiment of an image storage device in accordance with the invention is characterized in that the image storage device also comprises a generating unit for generating addresses for the display of cells in which the image characteristics have been detected, and their neighbor cells on a display device. Relevant areas of the image can, thus, be simply displayed.

A further embodiment of an image storage device in accordance with the invention is characterized in that either the first storage unit or the second storage unit is capable of communicating with the computer in order to read data. The further processing can, thus, be accelerated. As a result, the computer does not have to wait.

DETAILED DESCRIPTION OF THE PREFERRED EMBODIMENTS

Figure 1:
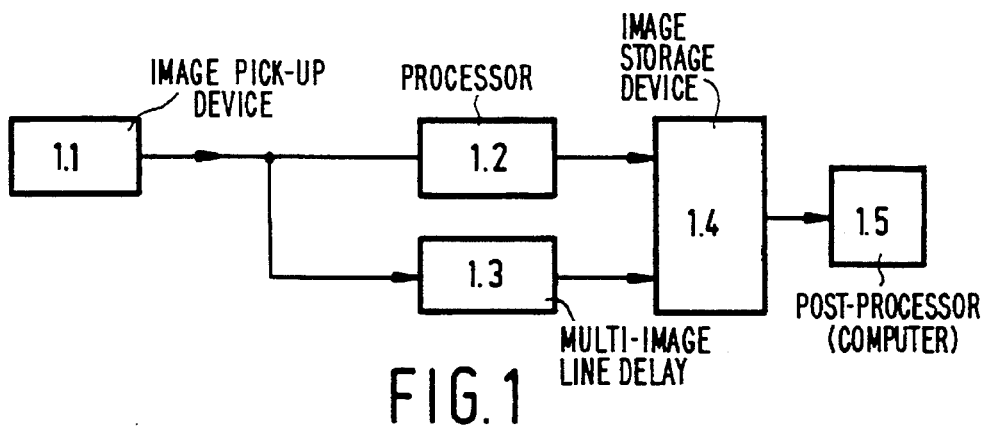
FIG. 1 shows an image processing device comprising an image storage device in accordance with the invention.

In FIG. 1, an image signal, which has serial, line-wise image data defining to pixels making up an image, is obtained by an image pick-up device 1.1, such as, for example, a laser scanner. The image signal is first applied to a known hardware processor 1.2 (see, for example, U.S. Pat. No. 4,736,438) which detects given image characteristics for example, an error (e.g., faults upon comparison with a reference model), edges, intensity gradients, given shapes or grey value gradients) therefrom and, on the basis of which, delivers trigger data, such as, addresses of detected image characteristics or categories of image characteristics, to an image storage device 1.4.

The image signal is also applied to a multi-image line delay device 1.3, for example, for 64 image lines, in which the image signal is delayed. Because the image data stream of the image signal is serial and line-wise and is temporarily delayed in the delay device 1.3, image data of image lines preceding (as well as coming after) an image characteristic and forming part(s) of the environment (i.e., relevant areas) of the image characteristic can be identified and temporarily stored in a working memory 2.1 (see FIG. 2) of the storage device.

The entire above-mentioned procedure is executed under the control of control signals (for example, signals indicating the end of an image line or the end of an image) originating from the image pick-up device 1.1. Subsequently, the stored relevant areas of the image can be further processed in a computer, e.g., post-processor 1.5, which performs, for example, a more detailed error analysis via software. The computer can determine, for example, a finer classification into error categories.

Figure 2:
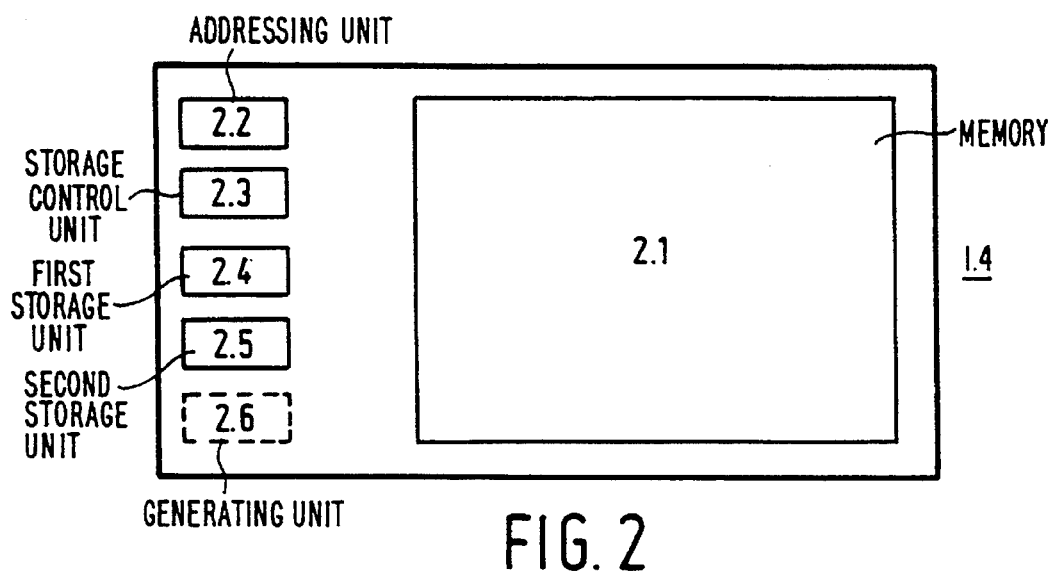
FIG. 2 shows an image storage device in accordance with the invention.

FIG. 2 diagrammatically shows image storage device 1.4 in accordance with the invention. It comprises a working memory 2.1; an addressing unit 2.2 for addressing the pixels making up the image as a grid of cells of pixels; a storage control unit 2.3 for storing in the working memory 2.1 at least those cells in which image characteristics have been detected, a first storage unit 2.4 for storing information concerning the location of cells in which the image characteristics have been detected; a second storage unit 2.5 for storing information concerning the position and the nature of each cell's detected image characteristic; and an optional generating unit 2.6 for generating addresses for the display of those cells in which image characteristics have been detected and cells neighboring them (i.e., neighbor cells by a display device (not shown). The image storage device 1.4 is fed under the control of control signals from the image pick-up device 1.1, it being possible for the computer (e.g., the post-processor 1.5) to commence the further processing during the storage of the relevant areas of the image and its associated information.

A laser scanner which scans, for example, a printed circuit board, produces an image (for example, a 3-dimensional image with combined intensity and height information which is converted into a 2-dimensional image signal) of, for example, 32K×32K pixels per image. Such an image is too large to be stored in its entirety in a working memory for real-time processing because real-time processing of such an image is too time-consuming. Therefore, in accordance with the invention, only relevant areas of the image are stored for further processing.

Each image is subdivided and addressed into uniform, multi-pixel image areas, so-called cells, preferably rectangular cells comprising m×n pixels, where m and n are arbitrary positive integers, by the addressing unit 2.2 (see FIG. 2) of the storage device 1.4. By way of example, the value 32 will be chosen hereinafter for m and n. In that case, the cells are square. Each image of 32K×32K pixels is subdivided into a grid of 1024×1024 disjunct cells.

The addressing unit 2.2 of FIG. 2 includes, for example, two counters: one for counting cells in the horizontal direction, and one for counting cells in the vertical direction. The horizontal cell counter is incremented every 32 pixels, and the vertical cell counter is incremented every 32 image lines. Both counters are 10-bit counters.

It should be noted that other image size, cell size, and/or cell shape, are also possible. Appropriate dimensions of the counters can be determined accordingly.

Figure 3A:
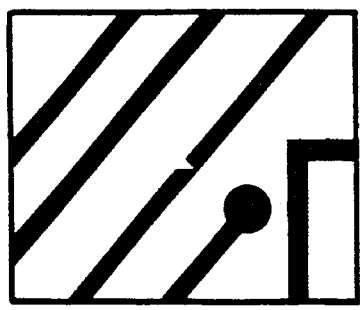
FIGS. 3A–C illustrate an image of a printed circuit board containing an error.
Figure 3B:
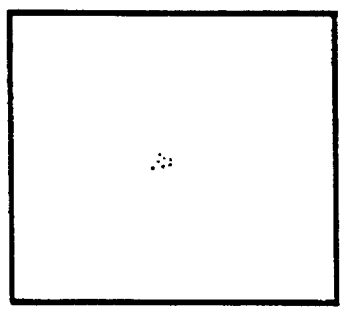
Figure 3C:
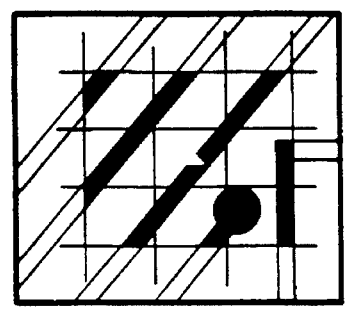

FIG. 3A shows an area of an image of a printed circuit board ("PCB") containing an error, i.e., an image characteristic. FIG. 3B shows the error as detected by the hardware processor. FIG. 3C illustrates which cells are stored in the image storage device.

The second storage unit 2.5 comprises an auxiliary memory, for example, a random-access memory ("RAM"), in which 1024 words (the same number as the number of cells in the horizontal direction of the grid of cells) can be stored. The auxiliary memory is addressed by the horizontal cell counter, i.e., each word in the auxiliary memory is associated with a corresponding situated cell in a horizontal row of cells with which the auxiliary memory is involved at a given instant. The auxiliary memory serves to collect information concerning relevant cells in the horizontal row of cells. Each word of the auxiliary memory contains a flag bit which is initialized to have the logic value 0 and which assumes the logic value 1 as soon as an image characteristic is detected in an associated cell. Because the image data is line-wise presented, the horizontal row of cells is also scanned in the form of image lines. For each word in the auxiliary memory whose flag bit has the logic value 1, the following information is written into the auxiliary memory:

(a) the position of the pixel within the relevant cell giving rise to the change of the logic value of the flag bit from 0 to 1 (this position is stored as a 5-bit x coordinate and a 5-bit y coordinate with respect to the first cell pixel scanned (the "top left-hand corner");

(b) the weight of the image characteristic, i.e., the number of pixels within the cell for which an image characteristic has been detected (a 10-bit counter is adapted each time the current scanned image signal traverses the relevant cell); and (c) an image characteristic code (a different code is assigned to different kinds of detected image characteristics by the hardware processor, and storage is realized utilizing, for example, 7 bits).

The second storage unit 2.5 also comprises a cell information memory in which the auxiliary memory words which contain a flag bit having the logic value 1 after the last pixel of the relevant cell in a horizontal row of cells with which the auxiliary memory is involved at a given instant has been scanned are copied. At the same time, these words are erased from the auxiliary memory. After the scanning of the last pixel of the last cell in that horizontal row of cells, the next horizontal row of cells can be processed.

The information accumulated for each of the relevant cells of a horizontal row of cells is stored in the cell information memory at the next free address therein.

Because in many applications the auxiliary memory will contain only a few cells with a flag bit having a logic value 1 after each horizontal row of cells has been scanned, a RAM of, for example, 2K words with a word length equal to that of the auxiliary memory (i.e., 28 bits) will suffice for the cell information memory. For example, when the working memory 2.1 can contain 2M words, so 2K cells approximately 400 cells in which image characteristics have been detected can be stored, plus approximately 1600 neighbor cells. The choice of the capacities of the memories used, of course, depends on the size of the working memory 2.1.

The cell information memory preferably has the ability to communicate with the computer (e.g., the post-processor 1.5) so that the latter can read data from the cell information memory for further processing even when a write operation takes place in the cell information memory. The cell information memory is then dual-ported. The flag bit can then serve to indicate the extent of filling of the cell information memory. It is to be noted that the working memory 2.1 need not be dual-ported because writing therein takes place only during a comparatively small fraction of the time, so that the computer has ample time for reading.

The first storage unit 2.4 comprises a cell address memory, for example, a RAM for 2K words, in which the addresses of relevant cells (i.e., cells containing detected image characteristics and neighbor cells) in the grid of cells are stored. The cell address memory also contains for each address a reference to an associated word in the cell information memory (e.g., the rank number in the cell information memory). If there is no associated word (i.e., a neighbor cell without image characteristics having been detected) in the cell information memory, the reference is a dummy value, for example, "0".

The cell address memory will contain the location of a cell in the grid of cells for each cell of 32×32 pixels stored in the working memory 2.1, and the cell information memory will contain (if a cell containing detected image characteristics is concerned) the information concerning the position and the nature of the detected image characteristics.

The separate storage of cell addresses and cell information results in a high flexibility. As a result, a cell address can, thus, be stored at a different instant with respect to the storage of the related information for that cell. This is advantageous when an environment of cells neighboring cells containing detected image characteristics are also stored. This is because by using the flag bit of a cell, an environment of neighboring cells which do not contain image characteristics can be determined in an environment generating circuit (see FIG. 4). As a result, the storage of the cell address is, thus, postponed. This image characteristic-free environment is of importance for the post-processor 1.5, for it facilitates the further processing.

Figure 4:
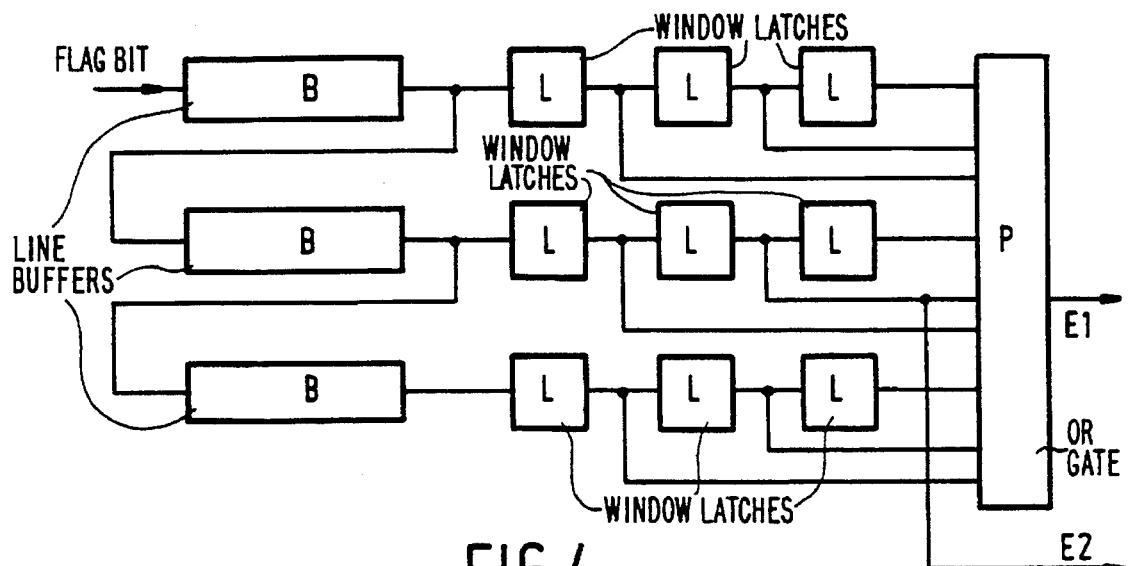
FIG. 4 shows a circuit for generating an environment.

FIG. 4 shows an environment generating circuit, which may form a part of the storage control unit 2.3 of FIG. 2. It comprises three line buffers B, nine window latches L and an OR-gate P. The line buffers B are written once per 32 lines and are read every line. This known circuit determines signals E1 and E2, which are used to store cells containing detected image characteristics and neighbor cells thereof without detected image characteristics in the working memory 2.1 of FIG. 2. (Hereinafter, cells in which image characteristics have been detected will be referred to as IC cells for the sake of simplicity, and cells which adjoin an IC cell (horizontally, vertically or diagonally) and which need not contain detected image characteristics themselves will be referred to as neighbor cells).

The input of the environment generating circuit of FIG. 4 are the flag bits of the cells. These flag bits are delayed in the line buffers B in such a manner that flag bits of cells which are vertically adjacent in the image are also vertically adjacent in a window formed by the 9 latches L. The signal E1 assumes the logic value 1 when at least one of the flag bits in the window has the logic value 1. The signal E2 assumes the same logic value as the flag bit in the center of the window. When E1 has the logic value 1 and E2 has the logic value 0, the cell associated with the flag bit in the center of the window will be a neighbor cell. When E2 has the logic value 1, the cell associated with the flag bit in the center of the window will be an IC cell. Conversely, the flag bit of every IC cell will at some time be situated in the center of the window (E2=1) and, when a flag bit of a neighbor cell arrives at the center of the window, at least one other flag bit in the window must have the logic value 1 (E1=1, E2=0). Each time when E1=1, the cell associated with the flag bit at the center of the window is stored in the working memory 2.1, and the grid address of that cell is stored in the cell address memory. The signals E1 and E2 are 2-bit binary encoded as a type code as follows:

11:E1=E2=1 (IC cell to be stored)

10:E1=1, E2=0 (neighbor cell to be stored)

00:E1=E2=0 (no IC cell or neighbor cell to be stored).

Figure 5:
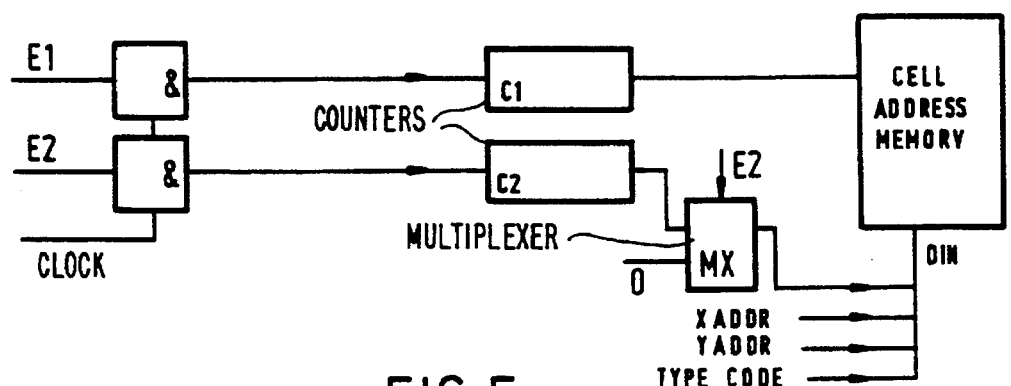
FIG. 5 shows an embodiment of a part of an image storage device in accordance with the invention.

The signals E1 and E2 are used to increment two counters (see FIG. 5). A counter C1 sums the logic values of E1, thus, counting how many (neighbor and IC) cells are to be stored. This count becomes the address for the cell address memory. A further counter C2 sums the logic values of E2, thus, counting the IC cells. This count (i.e., the count of counter C2) is applied to a multiplexer MX which also receives the signal "0", the signal E2 being used as the input select signal for the multiplexer. If E2=0, the multiplexer outputs the value 0. If E2=1, the multiplexer outputs the value of the counter C2. The output of the multiplexer provides the reference number to the word in the cell information memory associated with an IC cell. This reference number is applied, together with the type code and the grid coordinates of the cell to the data input of the cell address memory. The 2K words in the address memory are then 33-bit words. The cell address memory preferably also has the ability to communicate with the computer (e.g., the past-processor 1.5) so that the latter can read data for further processing from the cell address memory even when a write operation takes place in the cell address memory. Therefore, the cell address memory is dual-ported.

The working memory 2.1 is capable of storing, for example 512K 8-bit words. A cell comprising 32×32 pixels is stored in an address block comprising 1024 address locations. There are 512 of such address blocks. The number of address bits for the working memory 2.1 then amounts to 19.

The addresses where the image signal delayed in the multi-image-line delay device 1.3 is to be stored are generated by the storage control unit 2.3. The storage control unit 2.3 assures that, even though the image signal is line-wise available so that image date from different image characteristic areas can be scanned in an intermixed manner, every relevant cell (i.e., IC cell or neighbor cell) is coherently stored in the working memory 2.1.

The storage control unit comprises a random-access memory which acts as a line buffer and in which numbers of relevant cells are stored. This is realized as follows. For cells to be stored, a cell number (originating from the counter C1 of FIG. 5) is written into the line buffer. For other cells, a dummy value "0" is written into the line buffer. A cell number is retained in the line buffer for 32 image lines. A cell number written into the line buffer remains selected for 32 pixels (i.e., 32 clock pulses).

Figure 6:
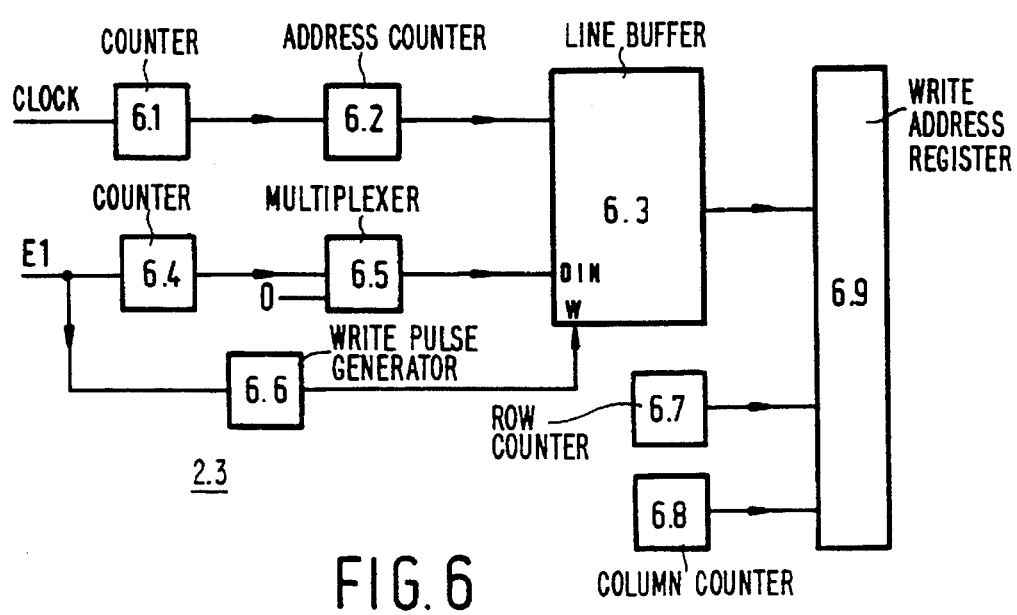
FIG. 6 shows an embodiment of a further part of an image storage device in accordance with the invention.

The storage control unit 2.3 may be constructed as shown in FIG. 6. A counter 6.1 supplies an address counter 6.2 with a pulse every 32 pixels (i.e., 32 clock pulses). The counter 6.1 is reset after each image line. The address counter 6.2 applies an address bit to a line buffer 6.3 which can contain 1024 9-bit words. A counter 6.4, which is the counter C1 shown in FIG. 5, counts the IC cells and neighbor cells, by way of the flag bits, up to a maximum of, for example, 512. The counter 6.4 is reset after each image. The multiplexer 6.5 applies a cell number from the counter 6.4 to the line buffer when the counter 6.4 is incremented. If not, the multiplexer 6.5 applies the dummy value "0" to the line buffer. A write pulse generator 6.6 applies a write pulse to the line buffer 6.3. The write pulse is the delayed trigger pulse from the counter 6.4 and overcomes the delay caused by the counter 6.4 and the multiplexer 6.5. The line buffer 6.3, thus, applies the correct cell numbers as addresses to a write address register 6.9 in which they are latched so as to be applied to the working memory 2.1. The write address register 6.9 is, for example, of the tri-state type, there being provided appropriate registers for read addresses and display addresses. When one of the registers is selected, the other two registers are deselected. Row counter 6.7 and column counter 6.8 of FIG. 6 provide the write address register 6.9 with the coordinates within a cell for the storage of the delayed image data.

For coherent display of cells form the working memory 2.1, the computer (e.g., the post-processor 1.5) extracts the necessary information from the cell address memory. Optional generating unit 2.6 provides the coupling between the display device and the working memory 2.1. This is realized, for example, by utilizing a look-up table ("LUT") in which the computer writes numbers of cells to be displayed. The generating unit 2.6 then control the correct addressing of the LUT.

I claim:

1. An image storage device, comprising:

addressing means for sequentially receiving image data defining pixels making up the image, and addressing the pixels as a grid of multi-pixel cells;

first storage means for storing information concerning where in the grid cells having particular image characteristics are located;

second storage means for storing information concerning position and nature of the particular image characteristics in the cells having the particular image characteristics;

working memory means for storing only image data defining those pixels included in the cells having the particular image characteristics; and storage control means for specifying, as the image data defining the pixels making up the image is being received, those pixels whose image data is to be stored in said working memory means;

wherein the image storage device stores only the image data defining those pixels included in the cells having the particular image characteristics, those pixels constituting less than all of the pixels making up the image.

2. The device as claimed in claim 1, further comprising generating means for generating addresses of the cells having the particular image characteristics for display of those pixels included in those cells by a display unit.

3. The device as claimed in claim 1, wherein said first storage means is adapted to communicate with a processor which processes the image data defining those pixels included in the cells having the particular image characteristics so as to obtain the information stored in said first storage means.

4. The device as claimed in claim 1, wherein said second storage means is adapted to communicate with a processor which processes the image data defining those pixels included in the cells having the particular image characteristics so as to obtain the information stored in said second storage means.

5. An image storage device, comprising:

addressing means for sequentially receiving image data defining pixels making up the image, and addressing the pixels as a grid of multi-pixel cells;

first storage means for storing information concerning where in the grid (a) first cells having particular image characteristics and (b) second cells neighboring the first cells are located;

second storage means for storing information concerning position and nature of the particular image characteristics in the first cells;

working memory means for storing only image data defining those pixels included in the first and second cells; and storage control means for specifying, as the image data defining the pixels making up the image is being received, those pixels whose image data is to be stored in said working memory means;

wherein the image storage device stores only the image data defining those pixels included in the first and second cells, those pixels constituting less than all of the pixels making up the image.

6. The device as claimed in claim 5, further comprising generating means for generating addresses of the first and the second cells for display of those pixels included in those cells by a display unit.

7. The device as claimed in claim 5, wherein said first storage means is adapted to communicate with a processor which processes the image data defining those pixels included in the first and second cells so as to obtain the information stored in said first storage means.

8. The device as claimed in claim 5, wherein said second storage means is adapted to communicate with a processor which processes the image data defining those pixels included in the first cells so as to obtain the information stored in said second storage means.

9. An image processing device, comprising:

image pick-up means for producing an image signal having image data defining pixels making up an image;

first processor means, coupled to said image pick-up means, for processing the image signal to detect particular image characteristics, and providing trigger data indicating where in the image signal the particular image characteristics are located;

an image storage device coupled to said first processor means and said image pick-up means, said image storage device including;

(a) addressing means for sequentially receiving the image data defining the pixels making up the image, and addressing the pixels as a grid of multi-pixel cells;

(b) first storage means for storing information concerning where in the grid cells having the particular image characteristics are located;

(c) second storage means for storing information concerning position and nature of the particular image characteristics in the cells having the particular image characteristics;

(d) working memory means for storing only image data defining those pixels included in the cells having the particular image characteristics; and (e) storage control means for specifying, as the image data defining the pixels making up the image is being received, on the basis of the trigger data, those pixels whose image data is to be stored in said working memory means;

wherein said image storage device stores only the image data defining those pixels included in the cells having the particular image characteristics, those pixels constituting less than all of the pixels making up the image;

delay means, coupled between said image pick-up device and said image storage device, for receiving the image signal and delaying it in time so that image data defining those pixels included in each of the cells is processed by said first processor means prior to the image data defining those pixels in that cell being received by said addressing means; and second processor means, coupled to said image storage device, for processing the image data defining those pixels included in the cells having the particular image characteristics.

10. An image processing device, comprising:

image pick-up means for producing an image signal having image data defining pixels making up an image;

first processor means, coupled to said image pick-up means, for processing the image signal to detect particular image characteristics, and providing trigger data indicating where in the image signal the particular image characteristics are located;

an image storage device coupled to said first processor means and said image pick-up means, said image storage device including;
   (a) addressing means for sequentially receiving the image data defining the pixels making up the image, and addressing the pixels as a grid of multi-pixel cells;
   (b) first storage means for storing information concerning where in the grid (i) first cells having the particular image characteristics and (ii) second cells neighboring the first cells are located;
   (c) second storage means for storing information concerning position and nature of the particular image characteristics in the first cells;
   (d) working memory means for storing only image data pertaining to those pixels included in the first and second cells; and
   (e) storage control means for specifying, as the image data defining the pixels making up the image is being received, on the basis of the trigger data, those pixels whose image data is to be stored in said working memory means;
   wherein the image storage device stores only the image data defining those pixels included in the first and second cells, those pixels constituting less than all of the pixels making up the image;

delay means, coupled between said image pick-up device and said image storage device, for receiving the image signal and delaying it in time so that image data defining those pixels included in each of the cells is processed by said first processor means prior to the image data defining those pixels in that cell being received by said addressing means; and second processor means, coupled to said image storage device, for processing the image data defining those pixels included in the cells having the particular image characteristics.

* * * * *